March 29, 1966 B. MAILLARD 3,242,812
SEMI-AUTOMATIC OR AUTOMATIC GUNS
Filed Sept. 14, 1964 6 Sheets-Sheet 1
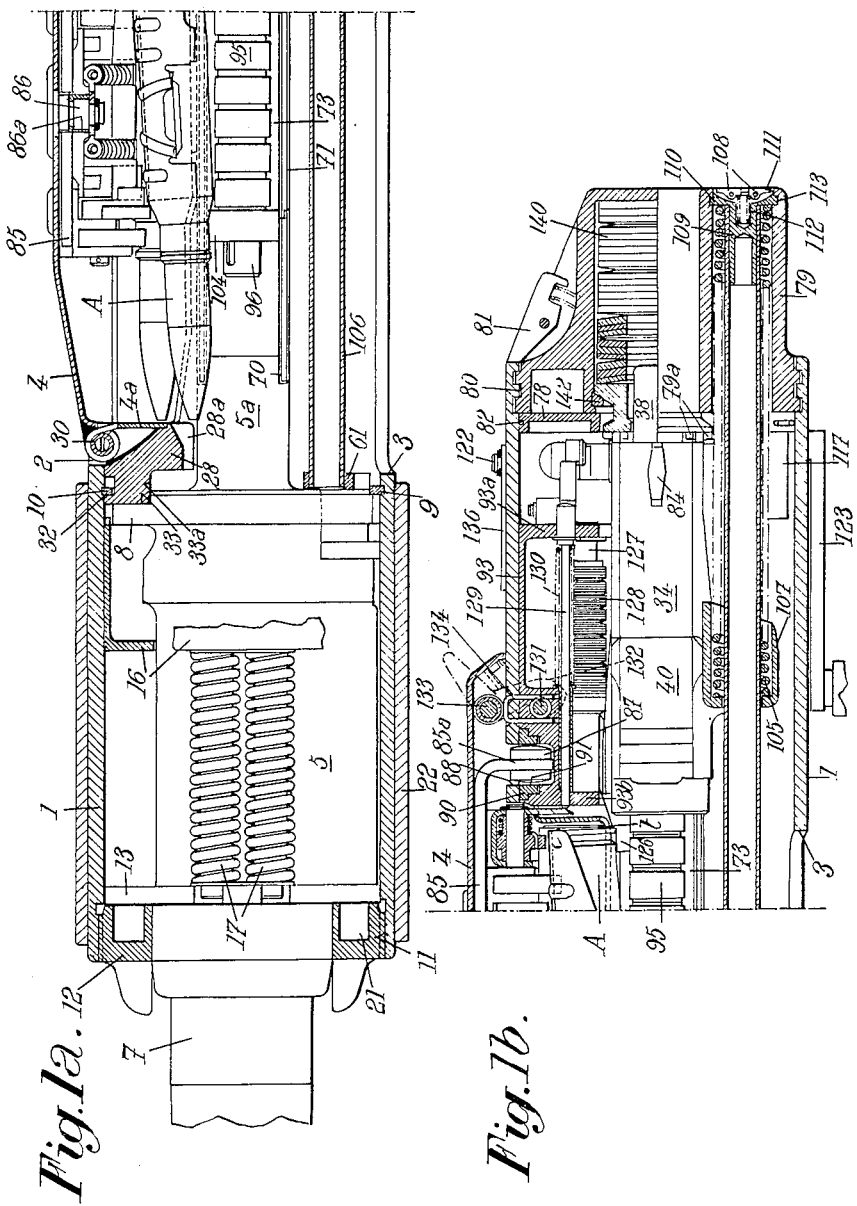

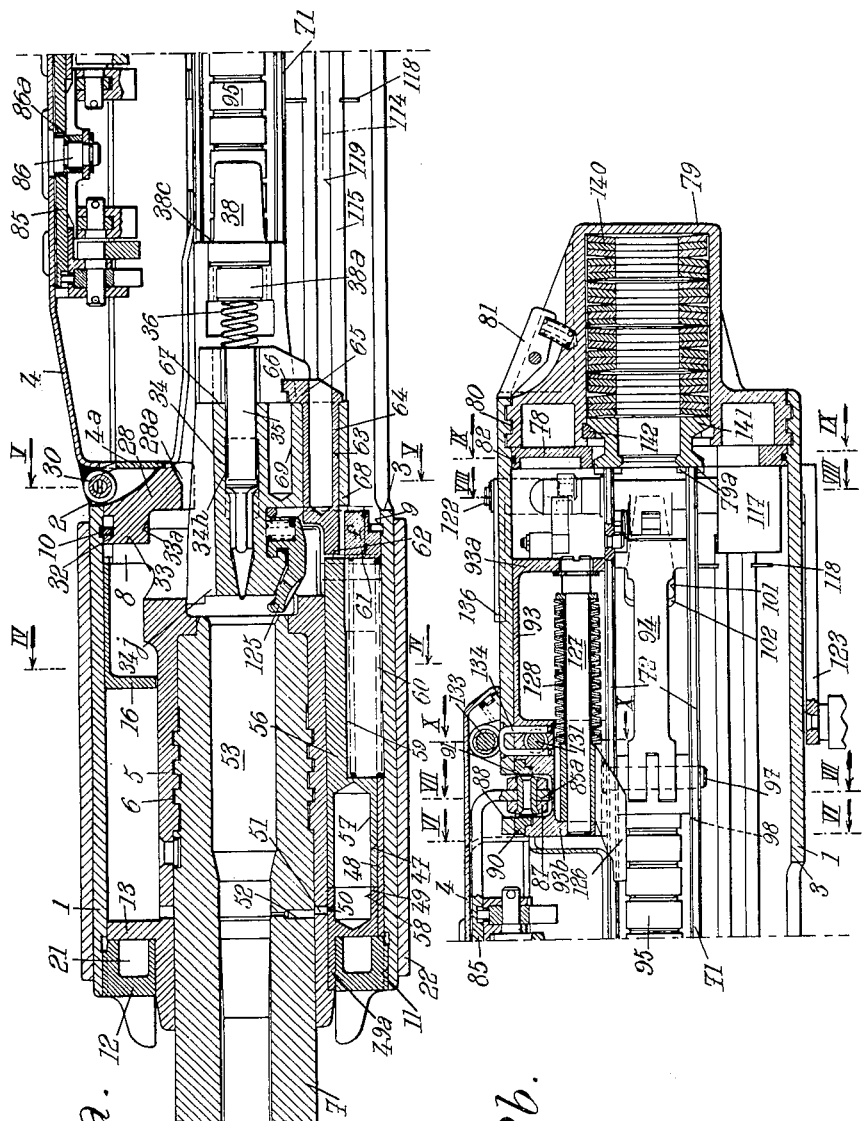

March 29, 1966  B. MAILLARD  3,242,812
SEMI-AUTOMATIC OR AUTOMATIC GUNS
Filed Sept. 14, 1964  6 Sheets-Sheet 4

United States Patent Office 3,242,812
Patented Mar. 29, 1966

3,242,812
SEMI-AUTOMATIC OR AUTOMATIC GUNS
Bernard Maillard, Geneva, Switzerland, assignor to
Brevets Aero-Mecaniques S.A., Geneva, Switzerland
Filed Sept. 14, 1964, Ser. No. 396,031
Claims priority, application Luxembourg, Sept. 19, 1963,
44,465
5 Claims. (Cl. 89—44)

The present invention relates to at least partly self acting guns, this term including automatic and semi-automatic guns, advantageously of a caliber ranging from 20 to 50 mm., comprising a breech casing, advantageously but not necessarily cylindrical, and at least the barrel of which recoils with respect to a non recoiling support, with the interposition of a buffer device.

It is known that semi-automatic and automatic guns are both self loading but that the firing of a shot may either require an action of the gunner (case of a semi-automatic gun) or not (case of an automatic gun).

According to the present invention, the above mentioned non recoiling support carries at least one abutment element extending to the inside of the breech casing through at least one opening therein, which opening is elongated in the direction of recoil displacements if the breech casing is rigid with the gun barrel, said buffer device being then housed inside the breech casing and interposed between said abutment element and a recoiling piece of the gun.

The advantage of this arrangement consists in a simple and little expensive connection between the gun and its support.

A preferred embodiment of the present invention as applied to the case of a machine gun will be hereinafter described with reference to the appended drawings, given merely by way of example, and in which:

FIG. 1a is an axial substantially vertical section of a portion of a machine gun according to the present invention;

FIG. 1b is a section in the same plane as that of FIG. 1a showing the portion of said machine gun located directly behind that illustrated by FIG. 1a;

FIGS. 2a and 2b are substantially vertical sectional views corresponding to FIGS. 1a and 1b, slightly offset with respect thereto;

FIG. 4 is a cross section of the machine gun on the line IV—IV of FIG. 2a;

FIG. 5 is a cross section of the machine gun on the line V—V of FIG. 2a;

FIG. 13 shows, on an enlarged scale, a detail of the structure illustrated by FIG. 3a;

Figures 3A, 3B:
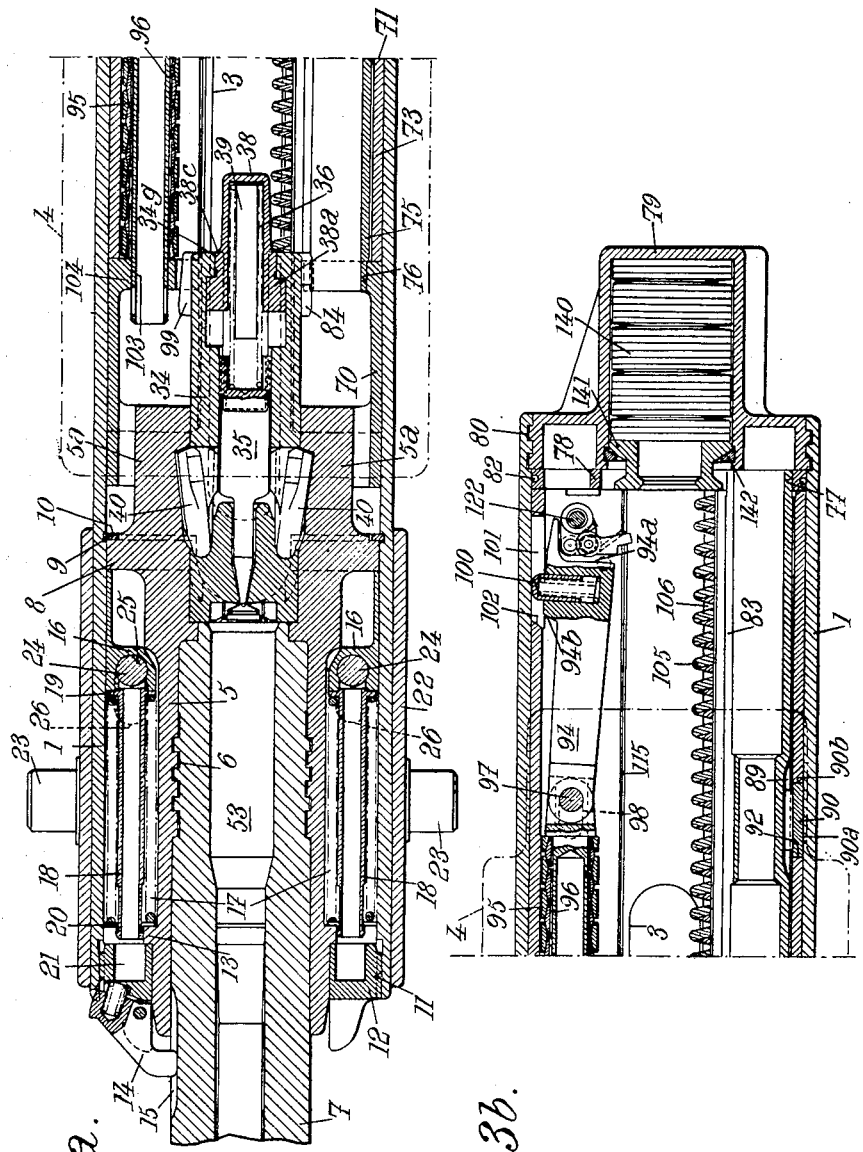
FIGS. 3a and 3b are axial horizontal sections corresponding to FIGS. 1a and 1b.

The following description relates to the case of a heavy machine gun, for instance of a caliber equal to 20 mm.

This gun comprises a tubular breech casing 1 of circular cross section and of substantially uniform diameter and thickness (the outer diameter being of the order of 100–130 mm.). Said breech casing 1 is provided, in its upper part, with an opening 2 adapted to receive a cartridge feed mechanism and in its under part, with an opening 3 for the ejection of spent cartridge cases. This breech casing 1 constitutes a kind of frame in the form of a tubular beam having a maximum rigidity for a given weight of metal.

Breech casing 1 may be made from a section of a tube, for instance of drawn and treated steel. It may also be made of two halves assembled, for instance by welding, along generatrices. Anyway, the machining of the breech casing can be made essentially by boring and turning and its manufacture is therefore particularly simple and economical.

In this breech casing 1 there is rigidly fixed a sleeve 5 to which the barrel 7 of the gun is fitted in a removable manner, through a bayonet joint 6. Sleeve 5 is provided, near the rear end thereof, with a reinforcing flange 8 the external diameter of which is equal to the internal diameter of breech casing 1. Said breech casing 1 is provided, on the inside thereof, with an annular groove 9 adapted to accommodate a resilient split ring 10 projecting inwardly with respect to the inner wall of breech casing 1 and acting as a rear abutment for sleeve 5. At its front end, breech casing 1 is provided with internal screw threads 11 cooperating with a nut 12 forming a front abutment for sleeve 5 by contact with a shoulder 13 thereof. Nut 12 carries a fixation lever 14 resiliently acted upon by a spring and capable, on the one hand, by engagement into a longitudinal groove 15 of barrel 7, of fixing said barrel with respect to sleeve 5, thus preventing it from disengaging from bayonet joint 6, and, on the other hand, of blocking nut 12 with respect to breech casing 1. The greatest portion of sleeve 5, extending from flange 8 to shoulder 13, is of cylindrical outer shape and has an external diameter smaller than the internal diameter of breech casing 1. In the elongated annular space thus left free between sleeve 5 and breech casing 1, there is provided, at the rear, a fixed inverted U-shaped strap 16 open at its lower end (see FIG. 4) and, extending from front to rear, several recoil absorbing springs 17. Fixed strap 16 has an external surface fitting to that of the inner wall of breech casing 1, which can therefore slide with respect to said strap. There are four springs 17 disposed symmetrically with respect to the axis of the barrel (see FIGS. 1 and 4), said springs being of helical shape and each wound about a tubular guide 18 which bears at the rear against strap 16 through a flange 19 integral with said guide 18. Each of the springs 17 bears, at the rear, on said flange 19 and, at the front, through a cap 20 wherein guide 18 is slidable on shoulder 13. Nut 12 is provided with an annular recess 21 open at the rear and into which fixed guides 18 slide freely when the gun is recoiling.

Strap 16 is secured to a tubular support 22 within which breech casing 1 is slidable. Support 22 is itself carried by a mount (or turret), through trunnions 23 which permit of aiming the gun for elevation. Strap 16 is secured to support 22 through two vertical spindles 24 disposed on either side of sleeve 5 in the same plane perpendicular to the axis of the barrel, said spindles extending, on the one hand, without play, in passages 25 provided in the vertical branches of strap 16, on the other hand, with a longitudinal play, through cylindrical breech casing 1, owing to the provision of elongated guiding slots 26 (FIG. 3a) and, still on the hand, without play, through holes 27 of tubular support 22. Thus the whole of breech casing 1, sleeve 5 and barrel 7 can recoil on every shot with respect to support 22, the recoil movement being absorbed by springs 17 which act between the shoulder 13 of sleeve 5 and strap 16 rigid with the non recoiling support 22.

Furthermore, due to the fact that there is no peripheral play between spindles 24 and their housings, said whole is angularly fixed with respect to support 22.

Figure 5:
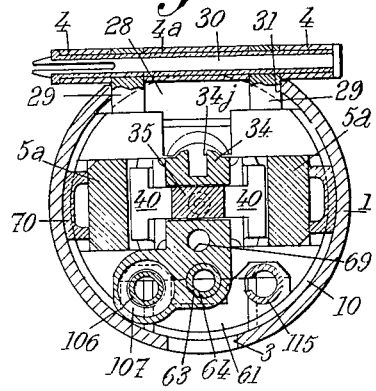

Inside breech casing 1 and immediately at the front of the upper opening 2, there is provided a cartridge feed device front support 28 the outer surface of which has, at least partly, as shown by FIG. 5, the shape of a portion of a circular cylinder fitting in the inner wall of breech casing 1. Support 28 is provided with two vertical extensions 29 through which passes a spindle 30 forming the pivot axis for the lid 4 and the under part 4a of the feed device. Extensions 29 fit against the edges 31 of an opening provided at the upper part of breech casing 1, thus angularly securing support 28. Support 28 is provided with a front abutment 33 in contact with the flange 8 of sleeve 5 and it is in contact at the rear with the above mentioned split ring 10 which engages into a recess 32 provided in said support 28. Support 28 is further provided with a horizontal flat face 33a held in contact with a corresponding flat face provided upon the flange 8 of sleeve 5. Said sleeve 5 is therefore prevented from turning with respect to breech casing 1 by support 28 which is itself prevented from turning with respect to said breech casing 1 as above explained. Support 28 further acts as deflecting means for the cartridge A that is being introduced into the cartridge chamber and, for this purpose, it is provided with a curved under face 28a for the guiding of said cartridge.

Figure 13:
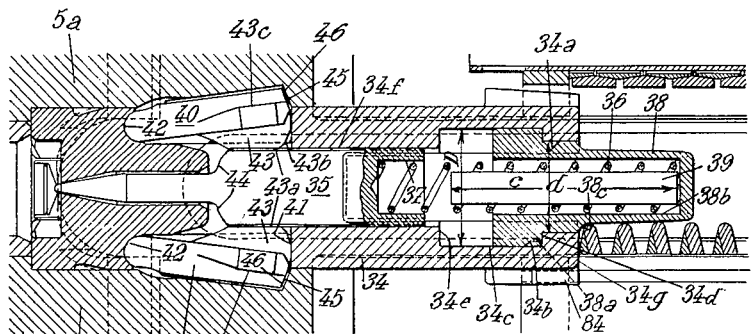

The gun includes a movable breech which essentially comprises a breech body 34 in which is slidably mounted with a limited amplitude of movement a firing pin 35. This firing pin 35 is urged frontwardly with respect to breech body 34 by a firing pin spring 36 as far as the position shown by FIGS. 2a, 3a and 13 wherein the front point of firing pin 35 projects to the outside of breech body 34. As shown by FIG. 5, the middle portion of firing pin 35 has a substantially rectangular cross section elongated in the horizontal direction. The front end of firing pin spring 36 bears against the bottom of a recess 37 provided at, and open toward, the rear end of firing pin 35 and the rear end of said spring 36 bears against the end face of a plug or cap 38, of general cylindrical shape, provided at its front with two lateral projections 38a. As shown by FIG. 13, breech body 34 is provided with a bore 34c of a diameter equal to D followed by two half cylindrical housings 34b disposed symmetrically with respect to the vertical plane passing through the axis of said breech body 34 and intended to accommodate projections 38a of cap 38. Said cap 38 is mounted in breech body 34 by being driven (with its projections 38a directed vertically) through a vertical recess 34h (FIG. 6) provided in the rear portion of breech body 34, and through a bore 34a of a diameter d smaller than D, thus compressing spring 36, after which cap 38 is turned through 90° about its longitudinal axis and then released, the pressure of firing pin spring 36 applying the rear flat surface of each projection 38a against a shoulder 34d of the corresponding housing 34b.

Breech body 34 is provided, at the rear thereof, with said bore 34a intended to accommodate the cylindrical portion, of diameter d, of cap 38. As shown by FIG. 2a, breech body 34 is provided with vertical and longitudinal slots extending frontwardly from the rear thereof as far as an abutment face 67, so that bores 34c and 34a are open laterally, in order to permit of mounting from the rear firing pin 35 and cap 38. It will be understood that cap 38 is movable frontwardly in housings 34b the shape of which is such as to prevent said cap 38 from rotating about its axis. The whole is arranged in such manner that, in operation, cap 38 does not come into contact with a second shoulder 34e forming the front face of bore 34c.

Firing pin spring 36 is a helical spring and a cylindrical floating member 39 is located in said spring. This member 39 preferably has an axial length c such that it fills up the space available between the rear end face of cap 38 and the bottom of the recess 37 of firing pin 35 when the latter is in its rear end position. As visible in FIG. 13, cap 38 is provided with a recess 38b against the bottom of which spring 36 bears and against which member 39 is also applied when it is in its rearmost position. Of course, before assembling cap 38 to the breech body, member 39 is placed in spring 36.

In its closing position (FIGS. 2a and 3a), the front portion of breech body 34 is housed between two arms 5a which form rearward extensions of sleeve 5, integral therewith, flange 8 being located at the level of arms 5a. In the front portion of breech body 34 and disposed symmetrically with respect to the vertical plane passing through the axis of barrel 7, are housed two locking members 40 which bear at the rear against the rear faces of a recess 41 extending vertically throughout breech body 34, said locking members 40 bearing at the front against semi-cylindrical surfaces 42 of breech body 34. The inner sides of locking members 40 are each provided, at the rear thereof, with a central projection 43 housed in a corresponding recess 41 of breech body 34 so as to be flush with the vertical walls of a passage 34f which constitutes a guide in the breech body 34. Each projection 43 includes a locking face 43a and, at the rear, a spreading face 43b adapted to be pushed outwardly, by an oblique face 44 carried by firing pin 35, into the position shown by FIGS. 3a and 13. In this position, a locking face 45, provided at the rear of each locking member 40, comes into contact with a cooperating locking face 46, provided in the inner surface of each of the arms 5a of sleeve 5. In this position, firing pin 35, by contact with the locking faces 43a of locking members 40, prevents said members from pivoting inwardly. Faces 45 and 46 have an inclination with respect to the direction of the forces transmitted from breech body 34 to its locking members 40 such that, account being taken of the relative friction coefficient of the constituting materials of locking members 40 (face 45) and breech body 34 (face 46), any effort exerted in the rearward direction upon locking members 40 tends to drive them toward the inside.

Figure 4:
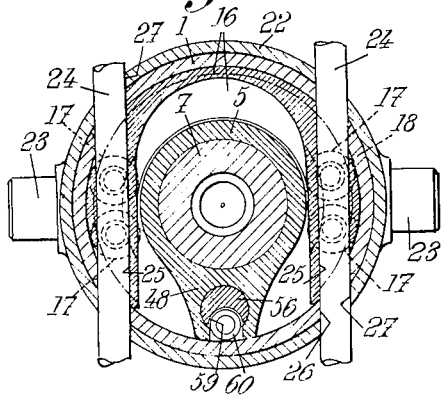

In order to produce the movement of retraction of firing pin 35 which is necessary to permit of releasing breech body 34, there is provided (FIG. 2a) a gas tap from barrel 7. For this purpose, a cylinder 47 is provided in a projecting ridge 48 of sleeve 5, at the front lower portion thereof, this ridge 48 being located between the vertical branches of strap 16 and being tangent to the inner surface of breach casing 1 (FIG. 4). As shown by FIG. 2a, cylinder 47 is closed at the front by a plug 49 kept in position by nut 12, both longitudinally by abutment against said plug 49 and in rotation by means of a projection 49a engaged between sleeve 5 and the inner wall of nut 12. This plug 49 is provided with a calibrated orifice 50 which communicates, through a hole 51 provided in sleeve 5 and a radial passage 52 provided in barrel 7, with the front end of the cartridge chamber 53 of the gun.

The front portion of a piston 56, slidable in cylinder 47, is provided with a recess 57 forming, together with a recess 58 provided in plug 49, an expansion chamber intended, in combination with calibrated orifice 50, to delay the action of the powder gases upon piston 56. The rear portion of said piston 56 is provided with a recess 59 located in its lower part and in which is housed a return spring 60 the front end of which bears upon the end wall of recess 59 and the rear end of which bears upon a support 61. This support 61 has an outer transverse cross section corresponding to the inner transverse cross section of breech casing 1 and it is fitted in sleeve 5 before its introduction into the breech casing, by sliding in a direction perpendicular to the axis of said breech casing. Furthermore, support 61 bears in the rearward direction against split ring 10.

The rear edge 62 of piston 56 cooperates with firing pin 35 and breech body 34 in the following manner. At its lower part, breech body 34 is provided with a smooth bore 63 the longitudinal axis of which is located in the vertical plane of symmetry of breech casing 1. In this bore 63 there is mounted, slidable with a limited amplitude parallelly to the axis of the barrel, a push-piece 64 provided at its end with a transverse flange 65. This flange 65 is engaged in a transverse groove 66 provided in the body of firing pin 35. Thus, push-piece 64 is made rigid with firing pin 35 (which cooperates with the above mentioned abutment face 67 provided on breech body 34) to limit the displacement of said firing pin 35 toward the front with respect to breech body 34, that is to say to limit the distance by which the front end point of firing pin 35 projects frontwardly from breech body 34. When firing pin 35 is in position for firing, push-piece 64 projects frontwardly from the portion 68 of breech body 34 that surrounds said push-piece by a length $f$ which is equal to the distance firing pin 35 must move back with respect to breech body 34 to permit release of the breech.

Thus, when powder gases escape through radial passage 52, they push back piston 56, which slides toward the rear in cylinder 47 and acts against the action of spring 60 (while sliding along support 61) through its rear edge 62 upon push-piece 64 to cause it to slide back a distance equal to $f$, this movement being transmitted, through the flange 65 of push-piece 64, engaged into the groove 66 of firing pin 35, to said firing pin 35. When piston 56 has moved back a distance equal to $f$, its rear edge 62 comes into contact with the front face of the portion of breech body 34 that surrounds push-piece 64 and the rearward movement of piston 56 is then transmitted both to firing pin 35 and to breech body 34.

Breech body 34 may be provided with a recess 69 to reduce its weight.

Figure 6:
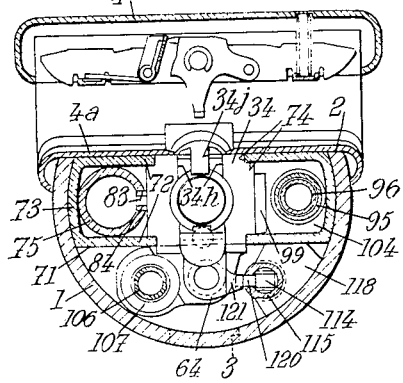
FIG. 6 is a cross section of the machine gun on the line VI—VI of FIG. 2b.

In its reciprocating movement, breech body 34 is guided by two longitudinal slideways diametrally opposed to each other inside breech casing and located at the same height. Each of these slideways comprises a front element 70 and a rear element 71. Said elements 70 and 71 are glued to the inner wall of breech casing 1 and riveted thereto. Each of said elements comprises two substantially parallel wings 72 disposed symmetrically with respect to the horizontal plane passing through the axis of breech casing 1. Said wings are integral with a web 73 the shape of which conforms with that of the inner wall of breech casing 1, the whole of web 73 and wings 72 having a U-shaped section. As shown by FIG. 6, breech body 34 cooperates with the wings 72 of the slideways only along the inner edges thereof, owing to angular contact surfaces 74 provided at four places on breech body 34. Thus, elongated spaces are left between breech casing 1 and the volume swept by the breech, both on the inside and on the outside of slideways 71 and 72, which spaces are used as it will be hereinafter explained for housing some mechanisms of the gun.

A first mechanism housed between the wings 72 of the left hand side slideways (FIGS. 6 to 8) consists of an elongated tubular cam 75 for actuating the cartridge feed mechanism of the gun. This cam 75 is adapted to oscillate about its longitudinal axis, which is parallel to that of barrel 7 but is offset laterally with respect thereto, owing to its mounting between two thrust bearings, to wit a front bearing 76 provided in a transverse partition rigid with the rear portion of that of the left hand front slideway element 70 and a rear bearing 77 provided in a rear plate 78. This plate 78 is kept in position longitudinally by being tightly held between the ends of the rear slideway elements 71 and the front face of a concave closing block 79 and, in rotation, by engagement of the rear edges of the wings 72 of said elements between projections 79a provided on the front wall of said plate 78, which projections further prevent deformations of wings 72. Block 79 is fixed in a removable manner at the rear of breech casing 1, for instance through a bayonet joint 80, this block 79 being prevented from disengaging by rotation owing to the provision of a locking lever 81 analogous to lever 14. Plate 78 is provided with an elastic lockwire 82 serving merely to prevent said plate from escaping from breech casing 1 when block 79 is removed.

Cam 75 is of a length averaging that of the stroke of breech body 34 (which stroke is visible by comparison between FIGS. 1a, 1b and 2a, 2b) and it extends from the rear end of breech casing 1 at least to the rear edge $t$ of the cartridge A which is being introduced (FIG. 1b). The front portion of this cam 75 therefore extends above ejection opening 3, not vertically over it, but on the left thereof when looking toward the front, as shown by FIGS. 3a and 6. Cam 75 is provided with a helical slot 83 in which is engaged a finger 84 rigid with and projecting from the left hand side of breech body 34 (FIG. 6) and at the rear end thereof (FIGS. 1 and 3a), said finger being located approximately in the horizontal plane passing through the axis of breech casing 1. During operation, finger 84 remains constantly engaged in slot 83. It will be understood that, in its to-and-fro movement, the breech causes cam 75 to rotate about its horizontal axis through an angle of about 150°.

Figure 7:
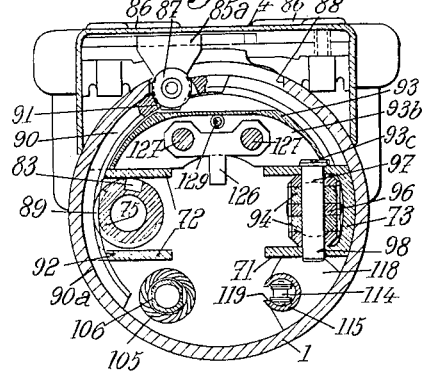
FIG. 7 is a cross section of the machine gun on the line VII—VII of FIG. 2b.

The feed mechanism is advantageously of the type described in U.S. Patent No. 3,198,075 as well as in the Luxembourg patent application No. 40,215, of June 2, 1961, and in the addition thereto No. 40,296 of June 21, 1961. It comprises a lever 85 guided by rollers 86a carried by two spindles 86 fixed to lid 4 and which is slidable transversely with a reciprocating translation movement to perform the feed of a cartridge belt and also the successive feed of the cartridges of said belt to position A. The vertically bent end 85a of this lever 85 carries a roller 87 engaged in a transverse slot 88 of breech casing 1 located in the upper portion of said breech casing. In order to transmit the movement of cam 75 to roller 87, which must move in the transverse direction, a toothed portion 89 of cam 75 cooperates with a toothed sector 90 having therein a recess 91 in which roller 87 is slidably held (FIG. 7). As shown by FIG. 3, toothed portion 89 is provided about at mid length of cam 75 and the ends of said cam engaged in bearings 76 and 77 are practically identical so that cam 75 can be mounted with either end thereof at the front.

Toothed sector 90 is housed wholly on the inside of breech casing 1 and it is located at the rear of the rear end of opening 2 serving to the introduction of cartridges. The external surface 90a of toothed sector 90 conforms exactly to the internal surface of breech casing 1 which thus constitutes a guide for said sector 90. In order to have sector 90 in tight contact with the inner wall of breech casing 1 while being in mesh with the toothed portion 89 of tubular cam 75, the web 73 of slideways 71, in which said cam is mounted, is provided with a passage 92 the front and rear edges of which guide the sides 90b of toothed sector 90. Finally, above slideways 71, the inner face of toothed sector 90 is further guided by the external wall of a support 93 which will be hereinafter referred to. Thus, in all its positions, toothed sector 90 is tightly guided and held in all directions and it can therefore transmit to the lever 85 of the breech mechanism, through roller 87, the movements of oscillation of cam 75.

Toothed sector 90 has, transversely, a shape and dimensions such that, account being taken of the positions and dimensions of slideways 71, it can be brought by rotation (in the clockwise direction, FIG. 7) to a position where it is cleared by said slideways, above them, which permits of mounting it by longitudinal translation after disengagement of roller 87.

Figure 10:
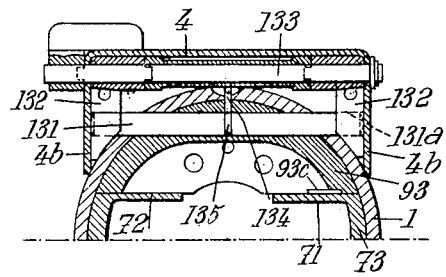
FIG. 10 is a half cross section of the machine gun on the line X—X of FIG. 2b.

A second mechanism of the gun, housed between the wings 72 of the right hand side slideway 71, is a mechanism for stopping firing. It includes a sear 94 and its shock absorbing device comprising for instance a spring 95 and its tubular guide 96. Sear 94 and guide 96 are mounted about a pin 97 which extends through slots 98 provided in the wings 72 of the right hand side slideway 71, these slots limiting the deformations of spring 95 during the operation. Sear 94 has a stop face 94a which cooperates with a stop face 99 (FIG. 6) provided on the breech body 34. Sear 94 is further provided with a spring mounted return piston 100 which urges said sear 94 toward the inside of breech casing 1. The web 73 of slideway 71 is provided with a recess 101 the front edge 102 of which recess forms an inclined plane capable of fully ensuring the engagement of sear 94 with the stop face 99 of breech body 34 when, during the compression of spring 95, the face 94b of said sear 94 reaches said front edge 102. The lower edge of support 93, has, above the end of pin 97, an abutment surface 93c capable of preventing said pin from moving out from slots 98 (FIGS. 7 and 10). Finally, guide 96, through the rear portion of which pin 97 extends, may be maintained at the front by sliding in a hole 103 provided in a transverse partition 104, said partition belonging to the rear portion of the right hand side front slideway 70.

Figure 11:
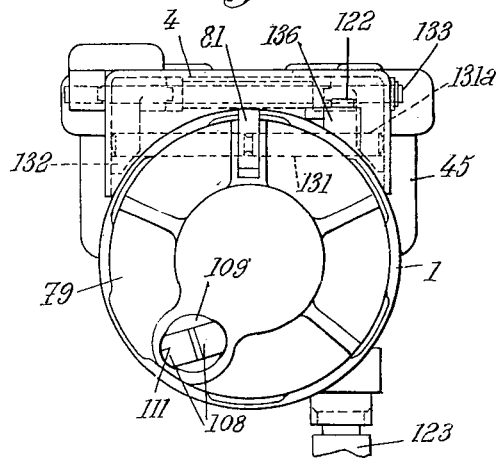
FIG. 11 is an end view of the machine gun seen from the right hand side of FIG. 2b.
Figure 12:
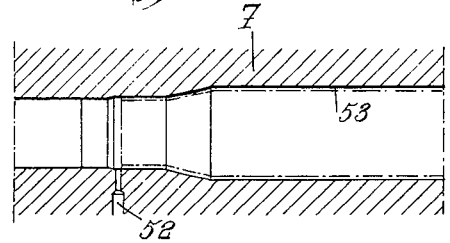
FIG. 12 shows, on an enlarged scale, the cartridge chamber of the machine gun.

In the elongated space located under the lower wing 72 of the left hand slideway is housed a third mechanism consisting of a return spring 105, of helical shape, disposed about a longitudinal tubular guide 106. This guide 106 is maintained at the front by support 61 and at the rear by closure block 79 in which it is secured by a self locking device. Return spring 105 bears at the front against a cup shaped member 107 integral with breech body 34 and projecting therefrom downwardly toward the left, as shown by FIGS. 5 and 6. Guide 106 bears upon closure block 79 through two pins 110 belonging to a plug 109 rigid with guide 106 and against which spring 105 is bearing. On the outside thereof, closure block 79 is provided with two recesses 111 to accommodate the ends of two stop levers 108 in the locking position shown by FIGS. 1 and 11, wherein levers 108 are urged by a spring 112. Pins 110 cooperate with a groove 113 provided in block 79, so as to form a kind of bayonet joint. In order to disengage guide 106, it therefore suffices to bear simultaneously upon the inner ends of levers 108 against the action of spring 112, for instance by means of a screwdriver, which disengages these levers from recesses 111 and permits of rotating plug 109 in the direction which disengages pins 110 from groove 113. Spring 105 then pushes plug 109 and guide 106 outwardly. It should be noted that this guide 106, and also spring 105, pass through a notch 78a provided in plate 78 in order to permit of removing the breech body.

In the elongated space located below the lower wing 72 of the right hand side slideway are housed the essential elements of a fourth mechanism, to wit the resetting mechanism. This mechanism comprises a chain 114 guided in a tubular guide 115 in such manner that, by rotation of a pinion 116 in mesh with said chain 114, it is possible either to pull said chain rearwardly for resetting the gun or to push it in the direction which places the chain out of action. Guide 115 is held, longitudinally, at the front by support 61 (FIG. 5) and at the rear by a projection 117 integral with plate 78 and, laterally, by the cooperation of fins 118 rigid with guide 115 with the inner wall of breech casing 1. Guide 115 is provided with a longitudinal slot 119 (FIGS. 2a and 7) from which projects a slider 120 connected with the front end of the chain and adapted to come into contact with the rear portion of a hooking projection 121 carried by push-piece 64 at the bottom part of the right hand side thereof.

Figure 8:
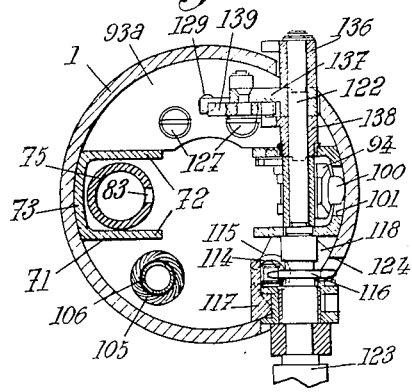
FIG. 8 is a cross section of the machine gun on the line VIII—VIII of FIG. 2b.
Figure 9:
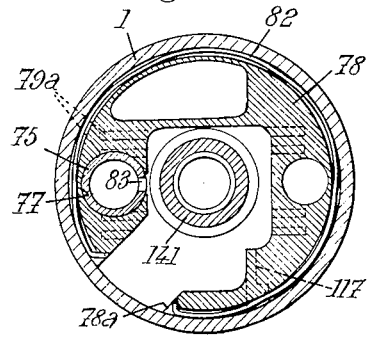
FIG. 9 is a cross section of the machine gun on the line IX—IX of FIG. 2b.

Pinion 116 is fixed on a spindle 122 which extends throughout the rear portion of breech casing 1, as shown by FIG. 8, and also through the wings 72 of the right hand side slideway 71. Upon the portion of spindle 122 that projects downwardly from breech casing 1 there is fixed a crank lever 123. In order to reset the gun, it suffices to rotate this lever 123 in the direction that moves toward the rear, first, slider 120 and consequently push-piece 64 and firing pin 35, and then, after the locking members 40 have been released by locking faces 43a, breech body 34 by contact of firing pin 35 with plug 38. During the resetting operations, the portion of chain 114 located at the rear of pinion 116 can move out laterally from breech casing 1 through a passage 124 (FIG. 8).

The four mechanisms which have been described (cam 75, sear 94 with damping device 95–96, return device 105–106 and resetting mechanism 114–115) extend from the rear of breech casing 1 to at least the transverse plane passing through the rear edge t of the cartridge A that is being introduced (FIG. 1b). It is still possible to house at least one other mechanism in the elongated space located above the upper wings 72 of the slideways rearwardly of said rear edge, such a mechanism being an ejector with a damping device and/or a rod for stopping the gun after the last shot, with the breech open.

For this purpose, on the trajectory of the spent cartridge cases which are driven rearwardly by an extractor 125 (FIG. 2a) carried by breech body 34, there is mounted an injector 126 (FIG. 1b) slidable on two rods 127 (FIGS. 1b, 7 and 8) fixedly parallelly to the axis of breech body 1, between two transverse walls 93a and 93b integral with support 93 (FIG. 1b). Between the rear of ejector 126 and the rear transverse wall 93a, there is provided around each rod 127 a juxtaposition of damping springs 128. As shown by FIGS. 2, 5 and 6, breech body 34 is provided at its upper end with a longitudinal recess 34j for the passage of ejector 126. Furthermore, above rods 127 and in the vertical plane passing through the axis of breech casing 1, there is mounted, slidable in walls 93a and 93b, a rod for stopping the gun after the last shot, the breech being open, said rod being designated by reference numeral 129 (FIGS. 1b and 6). Such a rod is moved frontwardly, when the feed mechanism is emptying, against the action of a return spring 130 and then causes breech body 34 to be caught by sear 94.

Support 93, at the rear of toothed sector 90, has an external shape coinciding with that of the inner wall of breech casing 1 and it is secured thereto through a transverse removable spindle 131 (FIGS. 1b, 2b and 10), which extends throughout breech casing 1 and support 93 as more particularly visible on FIG. 10. Support 93 may further be held in contact with the upper wings 72 of slideways 71. The ends 131a of spindle 131 project from breech casing 1 so that hooks 132, pivotable about a spindle 133 carried by the lid 4 of the feed mechanism, can engage under said ends so as to keep the lid closed. In this position, spindle 131 is secured not only by a resilient pin 134, extending both through breech casing 1 and through support 93 and engaging in a groove 135 provided in spindle 131, but also by the sides 4b of lid 4, whereas pin 134 is itself secured by spindle 133 which is then above it.

In order to actuate sear 94, there is provided a trigger mechanism supported by spindle 122, on which it is mounted loose. Such a mechanism includes, on the outside of breech casing 1 and on the side opposed to crank lever 123, a trigger lever 136 and, on the inside of said breech casing 1, an intermediate lever 137 connected through dog clutch means with trigger lever 136 and a second intermediate lever 138 connected to the first one through an equalizer bar 139 subjected to the influence of stop rod 129.

Finally, the gun comprises a damping and accelerating spring 140 housed in closure block 79 and bearing at the front upon a rigid abutment ring 141 projecting to the outside of block 79. Spring 140 is kept compressed by a split ring 142 which limits the frontward displacement of ring 141, ring 142 being housed in a groove provided at the front of block 79. Plug 38 is arranged to come into abutment with ring 141 at the same time as the breech body and it is provided for this purpose with a shoulder 38c which is joined to the rear face 34g of breech body 34 so as to form together a surface fitting with that of abutment ring 141.

This gun works as follows:

Before firing, the elements are in the positions shown by FIGS. 1a and 1b. Breech body 34 is held in rear position by sear 94 and a cartridge A is in position for being introduced into the gun. Firing pin 35 is held rearwardly with respect to the breech body against the action of spring 36, by contact of its oblique faces 44 with the spreading faces 43b of locking members 40, which are kept inside recesses 41 by contact of faces 43c with the ings 72 of slideways 71.

By acting upon trigger lever 136, the gunner causes breech body 34 to be released from sear 94. The breech (breech body 34, push-piece 64, extractor 125, firing pin 35, locking members 40, plug 38) is driven toward the front by spring 105 and pushes cartridge A into chamber 53. Once the breech body has reached its front position, shown by FIGS. 2a and 3a, firing pin 35 which, up to then, was held toward the rear of the breech body as above described is projected toward the front by the effect of its inertia and under the thrust of spring 36. By contact of its oblique faces 44 with the faces 43b of the locking members 40, firing pin 35 drives locking members 40 outwardly into the position shown by FIGS. 3a and 13, and passes between the locking faces 43a of locking members 40, which locks the breech body in position. Firing pin 35 is thrust in its frontward movement by the mass of plug 38 which keeps moving frontwardly under the effect of inertia against the action of spring 36, which spring is compressed until it stops said plug 38 and pushes it back toward the rear. At the same time, floating member 39 is projected toward the front by inertia, which movement, on the one hand, further facilitates the relative displacement of firing pin 35 toward the front with respect to breech body 34 and, on the other hand, prevents rebounding of said firing pin toward the rear. After firing of the cartridge, powder gases from barrel 7 act on piston 56 which first acts only upon push-piece 64 in order to push back firing pin 35 toward the rear and to permit retraction of locking members 40 inwardly. Then said piston 56 acts directly upon breech body 34, which causes it to move rearwardly, such a rearward movement being further produced by the residual pressure of the gases on the breech body through the cartridge case. At the end of the recoil stroke, breech body 34 comes into contact with abutment ring 141 and compresses spring 140 which sends it back toward the front. During the recoil movement, engagement of the finger 84 of breech body 34 with the helical slot 83 of cam 75 causes said cam to rotate about its axis and, through toothed sector 90, it actuates the feed mechanism which brings a fresh cartridge into waiting position A. Then the above described cycle is repeated either until the gunner ceases to act upon trigger lever 136 or until rod 129 automatically causes the breech body to be caught by sear 94. It should be noted that, on every shot, the whole of barrel 7, sleeve 5 and breech casing 1 recoils in support 22 against the action of absorbing springs 17.

Figure 14:
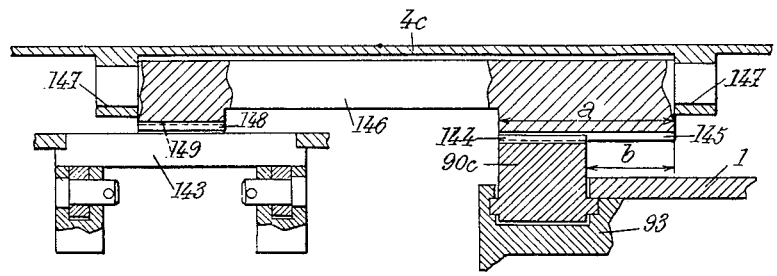
FIGS. 14 and 15 show, similarly to FIG. 2b, two modifications, respectively, of a machine gun according to the present invention.
Figure 15:
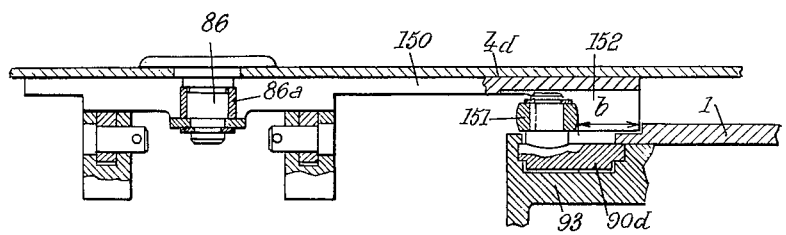

The feed mechanism, instead of being fixed to breech casing 1 and thus of participating in the recoil movement of the gun as in the arrangement above described, might be carried by an element rigid with support 22, in which case it would not participate in the recoil movement. In this case, it suffices to provide between toothed sector 90 and the feed mechanism a connection permitting relative displacement due to recoil. FIGS. 14 and 15 illustrate two such connections given by way of example.

In the construction of FIG. 14 the feed device comprises a fixed lid 4c and a sliding member 143 which is to be given a horizontal reciprocating translatory movement. The connection then consists in the following elements:

External teeth 144 carried by a toothed sector 90c analogous to the toothed sector 90 of FIGS. 1b, 2b, 3 and 7 and which is at least partly housed in breech casing 1, said teeth 144 having the same axis as said breech casing;

A toothed sector 145 carried by a spindle 146 journalled on lid 4c through bearings 147, this toothed sector 145 having its axis in coincidence with the oscillation axis defined by said bearings 147, and A second toothed sector 148 also carried by spindle 146 and in mesh with a rack 149 carried by sliding member 143.

Sector 145 has a width a greater than that of teeth 144 by an amount b of the order of the recoil stroke of breech casing 1, so that sector 145 is always in mesh with teeth 144.

In the construction of FIG. 15, the feed mechanism comprises a fixed lid 4d and a sliding member 150 movable with a longitudinal reciprocating translatory motion, this member 150 being guided, in the same manner as the lever 85 of FIGS. 1a, 1b and 2a, 2b, by means of two spindles 86 and rollers 86a. The connection between toothed sector 90d and the feed mechanism comprises a roller 151 carried by toothed sector 90d on the outside of breech casing 1 and cooperating with an elongated groove 152 provided in sliding member 150. In order to keep roller 151 engaged in groove 152, said groove has, in a direction parallel to the axis of breech casing 1, a length greater than the above mentioned value b.

In a general manner, while the above description discloses what is deemed to be practical and efficient embodiments of the present invention, said invention is not limited thereto as there might be changes made in the arrangement, disposition and form of the parts without departing from the principle of the invention as comprehended with the scope of the appended claims.

What I claim is:

1. An at least partly self acting gun which comprises, in combination, a fixed support, a gun barrel slidable longitudinally under the effect of recoil with respect to said support, a breech casing at the rear end of said gun barrel, said breech casing being provided with at least one opening, an abutment element rigid with said support and extending through said opening into said breech casing, and a buffer device interposed between said slidable gun barrel and said abutment.

2. An at least partly self acting gun which comprises, in combination, a fixed support, a gun barrel slidable longitudinally under the effect of recoil with respect to said support, a breech casing at the rear end of said barrell rigidly fixed thereto, said breech casing being provided with a slot opening parallel in the direction of the axis of said barrel, an abutment element rigid with said support and extending through said slot opening, and a buffer device in said breech casing interposed between a portion thereof and said abutment.

3. A gun according to claim 2 wherein said abutment is arranged to prevent rotational displacements of said gun barrel about its axis.

4. A gun according to claim 2 wherein at least the front portion of said breech casing has a cylindrical external shape, said support comprising a cylindrical guiding portion adapted to cooperate directly, during the recoil movement, with the cylindrical front portion of said breech casing.

5. A gun according to claim 2 wherein said buffer device comprises a plurality of compression springs extending parallel to the axis of said barrel.

No references cited.

BENJAMIN A. BORCHELT, *Primary Examiner.*

F. C. MATTERN, *Assistant Examiner.*